United States Patent

Aleksoff

3,762,215
Oct. 2, 1973

[54] TIME AVERAGE HOLOGRAPHIC CONSTRUCTION TECHNIQUES USING A MODULATED BEAM

[75] Inventor: Carl C. Aleksoff, Ann Arbor, Mich.

[73] Assignee: Battelle Development Corporation, Columbus, Ohio

[22] Filed: May 5, 1971

[21] Appl. No.: 140,504

Related U.S. Application Data

[63] Continuation-in-part of Ser. No. 831,090, June 6, 1969, abandoned.

[52] U.S. Cl. .................................. 73/71.3, 350/3.5
[51] Int. Cl. ...................... G01n 25/00, G02b 27/00
[58] Field of Search ................. 350/3.5; 356/106 R; 73/71.3, 67.5 H

[56] References Cited
UNITED STATES PATENTS
3,511,569  5/1970  Mackta ............................ 350/3.5 X

OTHER PUBLICATIONS
Aleksoff, Applied Physics Letters, Vol. 14, No. 1, Jan., 1969, pp. 23–24.
Mottier, Applied Physics Letters, Vol. 15, No. 9, Nov. 1969 pp. 285–287.
Neumann et al. Jour. of the Optical Soc. of America, Vol. 59, No. 4, April 1969, p. 474.
Mottier, Applied Physics Letters, Vol. 15, No. 2, July 1969, pp. 44–45.

Primary Examiner—David Schonberg
Assistant Examiner—Ronald J. Stern
Attorney—Woodcock, Washburn, Kurtz & Mackiewicz

[57] ABSTRACT

A technique for examining vibratory or other changing characteristics of an object by constructing a time averaged hologram of the changing object. In one embodiment, the hologram constructing reference beam is of a single frequency distinct from that of the object illumination beam. In other embodiments, either the reference beam, the object illuminating beam or the object modified beam is modulated to include a plurality of frequencies.

16 Claims, 10 Drawing Figures

Frequency Spectrum of object illumination beam

Fig.3a

Frequency Spectrum of object modified beam

Fig.3b

Frequency Spectrum of reference illumination beam

TIME AVERAGE HOLOGRAPHIC CONSTRUCTION TECHNIQUES USING A MODULATED BEAM

This application is a continuation-in-part of parent application, Ser. No. 831,090, filed June 6, 1969 now abandoned.

BACKGROUND OF THE INVENTION

This invention relates generally to holography and more specifically to the use of holographic techniques for vibration analysis.

Fundamental techniques of wavefront reconstruction (holography) are described by Leith and Upatnieks in the *Scientific American*, Vol. 212, No. 6, pages 24–35 (June, 1965), and in U.S. Pat. No. 3,506,327, issued Apr. 14, 1970. A hologram is constructed by interfering two coherent radiation beams, such as electromagnetic radiation within the visible spectrum, at a hologram detector, such as photographic film. An object to be recorded is placed in the path of one of said beams to generate object-modified radiation which strikes the hologram detector. The other radiation beam, called a reference beam, intersects the object-modified beam at a finite angle therewith. After the detector is processed, such as by developing the photographic film in an ordinary manner, a hologram of the object results. When the hologram is illuminated with radiation which corresponds to the reference beam radiation, the object-modified beam is reconstructed to form a three-dimensional image of the object.

The use of this holographic technique for analyzing an object vibrating with various points thereof having different amplitudes of vibration is described in U.S. Pat. No. 3,548,643, issued Dec. 22, 1970, and by Powell and Stetson in the *Journal of the Optical Society of America*, Vol. 55, No. 12, pages 1593–1598 (Dec., 1965). Briefly, the technique described therein includes placing the hologram detector so the object is vibrating generally in a direction perpendicular thereto. The hologram detector is exposed for a large number of cycles of object vibration to form a time averaged hologram. Upon reconstruction of the hologram, a modified image of the object includes a pattern of light and dark fringes from which the amplitude of vibration at various portions of the object may be determined. The reconstructed light intensity at a given point of the object image is related to the amplitude of vibration of that object point by the square of a zero-order Bessel function of the first kind. This technique, without more, is very useful for most vibration analysis applications but suffers from certain limitations in other applications. A major limitation is that the object image reconstruction is brightest where the object has zero vibration. Areas of the object with a high amplitude of vibration are generally dark overall with a fringe pattern that is difficult to detect. This can be seen in certain of the object image reconstructions shown in the aforementioned Powell and Stetson article, especially FIG. 4(f) thereof.

Therefore, it is a primary object of this invention to provide a technique of vibration analysis by time averaged holography which allows detection of differences in amplitude of vibration of those portions of the object which generally have large vibrational amplitudes.

It is a further object of this invention to provide a technique for detecting small vibrations in the object which are usually not detectable by the technique described in the aforementioned Powell and Stetson article.

It is an additional object of this invention to provide a technique in which the vibratory amplitude may be determined with controlled sensitivity.

It is also an object of this invention to provide a technique where the fundamental frequency of vibration of an object and its harmonics may be determined.

Additionally, it is an object of this invention to provide a technique for determining the relative phase of vibration between different points of a vibrating object.

SUMMARY OF THE INVENTION

These and additional objects are accomplished by the present invention by constructing a time averaged hologram during a plurality of vibratory cycles of an object with various points thereof moving with different amplitudes of vibration, wherein the reference beam includes at least one radiation frequency which differs from the radiation frequency of the object illuminating beam by an amount that is related to the frequency of object vibration.

According to one aspect of the present invention, the reference beam radiation includes substantially a single radiation frequency which differs from the single object illumination radiation utilized an amount equal to an integral multiple of the fundamental object vibration frequency. If the reference beam differs from the object illuminating beam by the fundamental frequency of object vibration, the reconstructed object image contains a fringe pattern for sufficiently large amplitudes of vibration. Furthermore, for small amplitudes of vibration, the brightness of the reconstructed object image is proportional to the amplitude of vibration. These improved results are also obtained when the reference beam differs in frequency from the object illuminating beam by two or more times the object vibration fundamental frequency. These techniques are useful for study of non-sinusoidal as well as for the study of sinusoidal object vibrations. A time averaged hologram constructed according to the techniques of this invention is illuminated with light to reconstruct an image of the object. Viewing optics are focused in space upon the reconstructed image of the object.

A further advantage of this aspect of the present invention is that the fundamental frequency of object vibration may be determined as the smallest difference between the reference beam, and object illuminating beam frequencies at which the object reconstructs brightly in some areas thereof.

Any convenient technique may be used to obtain a reference radiation beam having a single distinct frequency from that of the object illuminating radiation beam, such as by using separate radiation sources tuned to different frequencies for the object illuminating and reference beams. Alternatively, a single radiation source may be used, as is customary in optical holographic work, with the addition of an appropriate apparatus inserted in the path of the reference beam to shift its frequency before striking the holographic detector. An ultrasonic diffraction cell or an electro-optic phase modulator are convenient devices for insertion in a reference light beam to shift its frequency a controllable amount.

According to another aspect of the present invention, a reference beam and an object illuminating beam are mutually coherent while one of the object illuminating, object modified or reference beams is modulated. The modulation is preferably at a frequency equal to the fundamental object vibration frequency. The modulating function is substantially the same as the object vibration function. Those object points which modulate the object illuminating beam with the same depth and phase at which the reference beam is modulated are reconstructed the brightest. This allows reconstructing an object image with a clear fringe pattern in those portions of the object having a large amplitude of vibration. Additionally, the relative phase of vibration between two or more object points may be determined from the fringe pattern of the reconstructed image. Furthermore, modulating one of the beams at a frequency equal to two or more times the object vibration fundamental frequency brings about the same advantages.

A beam may be so modulated, in a preferred embodiment utilizing optical holography, by an electrically excited optical crystal placed in its path. Many other specific techniques may also be used to satisfactorily accomplish beam modulation both with optical and other radiation.

Certain aspects of the techniques of the present invention are described more fully by the inventor herein in *Applied Physics Letters*, vol. 14, no. 1, pages 23–24, (Jan. 1, 1969). For a more detailed disclosure of the invention and for further objects and advantages thereof, reference should be had to the following description taken in conjunction with the accompanying drawings.

DESCRIPTION OF THE PREFERRED EMBODIMENT

The techniques of the present invention are described in its preferred form herein utilizing electromagnetic radiation within the visible spectrum. It should be understood, however, that the techniques of the present invention may be utilized with any form of radiation used in practicing holography. Such radiation includes, for example, particle radiation, such as an electron beam, or electromagnetic radiation, such as light, or acoustic radiation such as sonic energy. Since the preferred forms of the present invention utilize light radiant energy, the present invention is so described.

Figure 1:
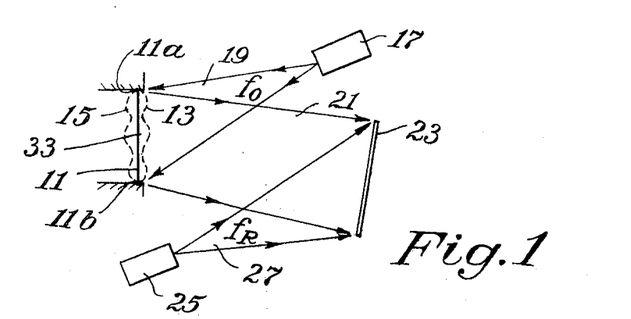
FIG. 1 illustrates generally a method of constructing a time averaged hologram of a vibrating object according to the present invention.

Referring to FIG. 1, a vibrating object such as a plate 11 is rigidly attached at its edges 11a and 11b. Some condition (not shown) causes the plate 11 to deform to positions of maximum vibration amplitude 13 and 15, exaggerated here for illustration. All points of the plate 11 do not have the same amplitude of vibration. A laser light source 17 emits an object illumination beam 19 having a frequency $f_o$. The vibrating plate 11 reflects and frequency modulates the object illuminating beam 19 into an obect-modified beam 21. A photosensitive detector 23 is positioned to intercept the object-modified beam 21. A laser light source 25 generates a reference beam 27 into a frequency $f_r$ and is directed onto the photosensitive detector 23 to interfere with the object-modified beam 21, thereby to record both phase and amplitude information of the object-modified beam 21 as averaged over a large number of plate vibrations.

Figures 2, 3A, 3B, 3C, 3D:
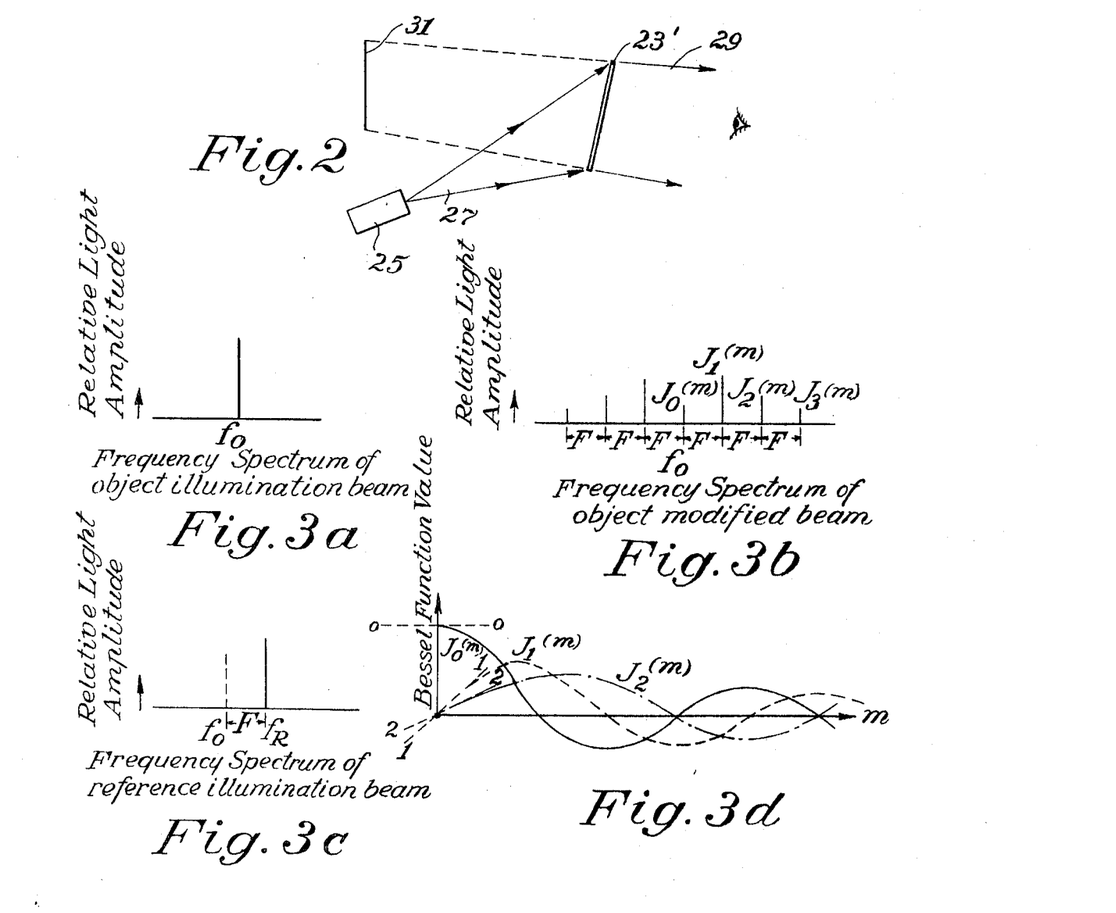
FIG. 2 illustrates a method for reconstructing an image of the vibrating object holographically recorded according to the method illustrated in FIG. 1.
FIGS. 3a, 3b, and 3c illustrate possible frequency components of radiation over a finite exposure period in the hologram constructing technique illustrated in FIG. 1.
FIG. 3d shows in graph form typical zero, first and second order Bessel functions which relate the depth of modulation $m$ (proportional to the amplitude of object vibration) with light image reconstruction intensity.

The techniques of holography require that an object-modified beam and a reference beam be coherent with each other. Otherwise, the object-modified beam is not properly recorded. Usual holographic techniques utilize a single laser light source with appropriate beam dividers and other optical elements so that the object illuminating beam and the reference beam are of exactly the same frequency. The technique described in the aforementioned Powell and Stetson article utilizes coherent object illuminating and reference beams; that is $f_o = f_r$. When the photosensitive detector 23 is properly processed, a hologram 23' is the result. When the hologram 23' is illuminated with a light beam similar to the reference beam of FIG. 1, an image carrying diffracted beam 29 is produced. The diffracted beam 29 is a reconstruction of the object-modified wavefront 21 as averaged over a period of many cycles of vibration of the plate 11. A virtual image 31 of the plate 11 has superimposed thereon dark and light fringes indicating a loci of points of the plate with equal amplitudes of vibration. Viewing optics, which may include a human eye, are focused upon the virtual image 31. When $f_o = f_r$ during construction of the hologram, the reference beam 27 interferes only with that portion of the object-modified beam 21 which is at that same frequency. Since the vibrating plate 11 generates various frequencies in the object-modified beam 21, only that information of the plate 11 clearly recorded are those portions which generate a frequency component equal to the reference beam frequency $f_r$. The vibratory characteristics of other portions of the object plate may often be desired and it has been found that the fringe patterns of these other areas are made clearer when the reference beam 27 contains at least one frequency $f_r$ that is not equal to $f_o$ and which differs therefrom an amount related to the fundamental frequency of vibration of the object plate 11.

Referring to FIGS. 3a, 3b, and 3c, one aspect of the present invention is described wherein the reference beam contains a single frequency $f_r$ ≠ $f_o$. Consider FIG. 3a which indicates the relative amplitude of the object illuminating beam 19 as a function of frequency over a period of time from the beginning of exposure of the photosensitive detector 23 until the end thereof. FIG. 3a shows entire beam amplitude concentrated at substantially a single frequency $f_o$.

Consider a specific case of sinusoidal object vibration. The vibration of the object plate 11 frequency modulates the object illuminating beam into an object-modified beam 21. A particular point 33 of the object will reflect light that may have a frequency spectrum something like that illustrated in FIG. 3b, the exact distribution depending on the amplitude of the sinusoidal vibration of the particular point 33. The complex waveform reflected from the point 33 is conveniently expressed in terms of the amplitude of its sinusoidal components a frequency F apart. The center bar indicates the relative amplitude of the sinusoidal component at the object illumination beam frequency $f_o$. If $f_o = f_r$, only this portion of the amplitude of the object-modified beam is recorded while the remaining components fog the photosensitive detector 23.

FIG. 3c shows the frequency spectrum of the reference beam 23 in a specific example of the present invention wherein $f_r$ is chosen to equal $f_o + F$, where F is the sinusoidal object vibration frequency. The reference beam 27 interferes with that frequency component of the object-modified beam equal to the value $f_r$. Information of the vibrating object is thereby recorded for interpreting its character of vibration by viewing a reconstructed image thereof. The reference radiation interferes with that portion of the object-modified beam produced by the object point 33 that is marked as $J_1(m)$ on FIG. 3b.

A time averaged hologram constructed with $f_o = f_r$ reconstructs an image of the object point 33 with a relative intensity proportional to the square of a zero-order Bessel function value for the particular amplitude of vibration of the object point 33. A zero-order Bessel function is plotted as $J_o(m)$ in FIG. 3d where m is the modulation depth due to the amplitude of vibration of the particular object point whose reconstructed intensity is of interest. Various points of the object vibrate with different amplitudes and thus reconstruct with different light intensities according to the $J_o(m)$ curve. It has been found that when the reference beam is shifted to a frequency $f_r = f_o + F$, the light intensity of a reconstructed object point is related to the amplitude of vibration (m) of that point by the first order Bessel function $J_1(m)$ shown in FIG. 3d. Operating on curve $J_1(m)$, instead of on the curve $J_o(m)$ as has been done heretofore, has several advantages. For instance, if reconstruction on those portions of the object with low vibration is desired, the curve $J_1(m)$ offers a much greater slope 1—1 than the slope 0—0 of the $J_o(m)$ curve. The greater slope results in a more observable reconstruction for low values of m. Furthermore, the slope 1—1 of the $J_1(m)$ curve is constant over a wider range of modulation depths than is the slope 0—0 of the $J_o(m)$ curve. The $J_1(m)$ curve may be preferred for clearer fringe patterns in areas of the object having other amplitudes of vibration where the slope of the $J_1(m)$ curve is greater than that of the $J_o(m)$ curve.

The techniques of this invention are not limited to operating within a first-order Bessel function but may be extended to other higher order Bessel functions. For a given amplitude of vibration of interest a second or higher order Bessel function may have the greatest slope and thus provide a more observable reconstructed fringe pattern about that particular amplitude of vibration. Therefore, the reference radiation beam would contain a single frequency $f_r$ equal to $f_o + 2F$ for operation on a second-order Bessel function curve $J_2(m)$, $f_o + 3F$ for operation on a third-order Bessel function curve (not shown), and so on. As can be seen from FIG. 3d, the slope 2—2 of the $J_2(m)$ curve is greater than the slope 0—0 of the $J_o(m)$ curve for low modulation depths (m). Therefore, operation on this curve results in a better reconstruction of object points having low amplitudes of vibration than is obtained by operation on the $J_o(m)$ curve. The same advantages are obtained by operating on even higher Bessel order curves.

Figure 4:
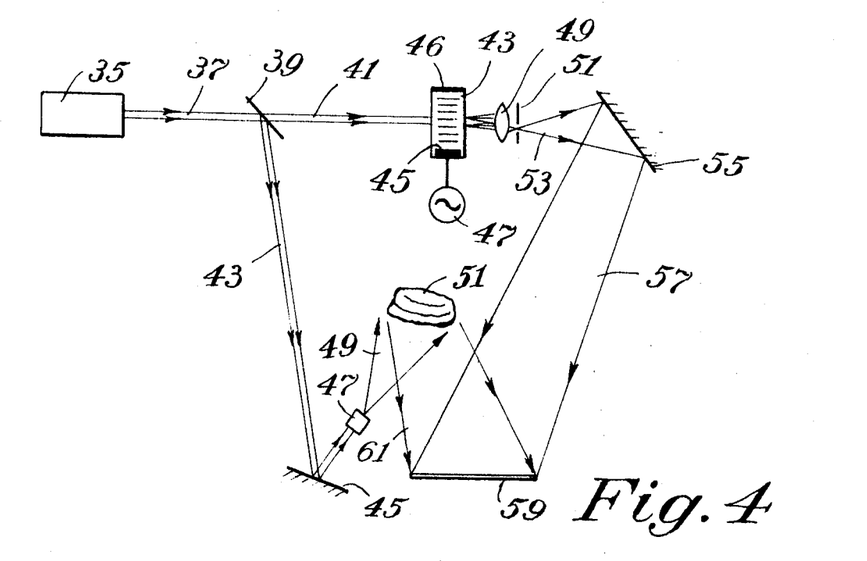
FIG. 4 shows a specific embodiment of the present invention wherein an ultrasonic diffraction cell is utilized to shift the reference beam frequency.

In a preferred embodiment of this aspect of the present invention, a single laser light source is used in combination with some means in the reference beam to shift its frequency a continuously adjustable amount. Such a system is shown in FIG. 4 wherein a single laser light source 35 generates a coherent light beam 37 which is divided by a beam splitter 39 into a reference component 41 and an object illuminating component 43. The object illuminating component is reflected from a mirror 45 and expanded by appropriate optics 47 to produce a light beam 49 for illuminating an object 51. The object 51 is not restricted to a planar object but may have a non-planar surface under examination. The reference component is passed through an ultransonic diffraction cell 43 containing a transducer 45 driven by an electronic oscillator 47 electrically connected thereto. An ultrasonic energy absorber 46 is located at the end of the cell opposite the transducer 45. The reference component 41 is thereby diffracted by a traveling ultrasonic wave into sidebands which differ from the frequency of the reference radiation portion 41 an amount equal to the frequency of the oscillator 47. A lens 49 brings these components to focus at a spatial filter 51 which allows only one sideband 53 to pass. A mirror 55 reflects the sideband light into a reference beam 57 which is directed upon a photosensitive detector 59 which interferes with an object-modified beam 61. Referring to the frequency spectra example illustrated in FIG. 3c, adjustment of the oscillation frequency of the oscillator 47 is equivalent to moving the time averaged amplitude of the reference beam illustrated in FIG. 3c along the horizontal base line relative to the object illumination beam frequency $f_o$.

It should be noted that sinusoidal object vibration function as assumed in this description often is the case. However, if the object is vibrating according to a more complex non-sinusoidal function, the reference beam is still displaced in frequency from that of the object illuminating beam by an amount equal to an integral multiple of F, where F is now the fundamental object vibration frequency.

According to another aspect of the present invention, useful information of a vibrating object may also be obtained when the reference beam is modulated to include a complete wavelength distribution that is generated by a point of the vibrating object of interest to completely record information of this point, thereby providing bright reconstruction of that point of the object. To generate these frequencies in the reference beam, a beam coherent with the object illuminating beam is frequency modulated by the same function as that driving the object. One way to accomplish this is to use a mirror mechanically driven to vibrate in a path substantially orthogonal to the reference beam path. If the vibration of the mirror has the same frequency and amplitude function as the vibration of a given point of interest on the object, the reference beam and that part of the object-modified beam generated from the given point will be perfectly matched in spectra components and thereby interfere completely. This point (which may be a broad area of the object) appears to be the most brightly reconstructed portion of an image of the object and fringe patterns representing points of vibration different from that of the given point clearly appear for determining vibration amplitude differences from that of the given point.

Figure 5:
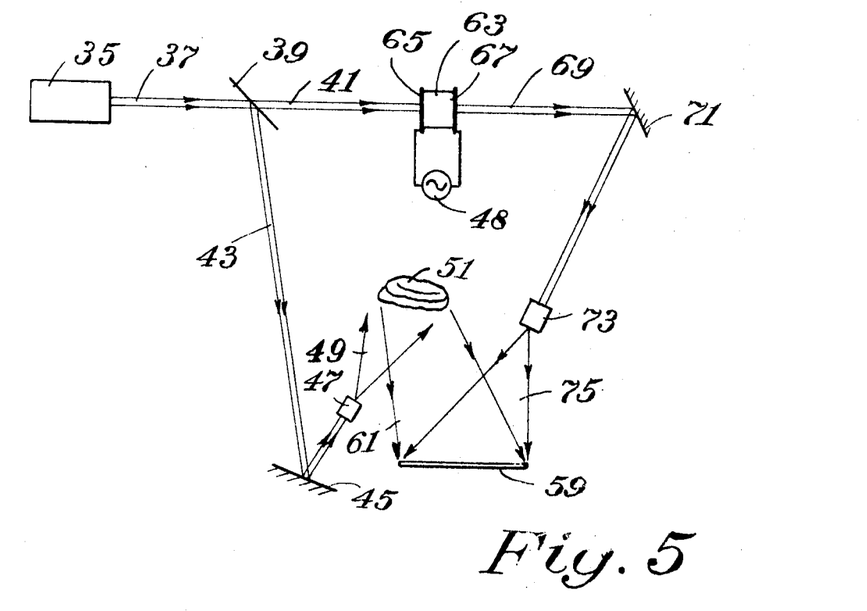
FIG. 5 shows another specific embodiment of the present invention which utilizes an optical crystal for modulating the reference beam.

A preferred arrangement for carrying out this aspect of the invention is illustrated in FIG. 5 wherein an optical crystal is used to modulate the reference beam in place of the more cumbersome mechanically driven mirror mentioned hereinabove. In FIG. 5, all elements that are common to those described with respect to FIG. 4 are given common reference numerals. In the reference radiation beam 41, an appropriate longitudinal electro-optic crystal 63 is placed having sheets of electrically conducting glass 65 and 67 on either side thereof. (Alternatively, a transverse electro-optic crystal having conducting sheets oriented parallel to the travel of light may be used). The oscillator 48 is connected across the sheets of conductive glass which cause changes in the optical crystal 63 to generate a reference beam 69 which is frequency modulated and thereby contains several frequencies over a period of time. The oscillator 48 must be capable of generating a waveform function which corresponds to the object driving function. This function may be sinusoidal but not necessarily. A modulated reference beam is reflected by a mirror 71 and expanded by an appropriate optical element 73 into a reference beam 75 which strikes the photosensitive detector 59 and interferes thereon with the object-modified beam 61.

The same beneficial results of the technique described with respect to FIG. 5 is also obtained if the object illuminating beam contains a plurality of specific light frequencies while the reference beam contains only a single light frequency. This variation of the technique is illustrated with respect to FIG. 6 wherein a vibrating object 51 is the subject of a hologram using generally the same elements, and thus denoted with the same reference characters, as FIG. 5. The modulating crystal 63 has been removed from the path of the reference beam 41 and has been repositioned in the path of the object illuminating beam 43. Thus, an object illuminating beam 50 of FIG. 6 obtains a plurality of frequencies resulting from modulation by the crystal 63. This frequency distribution may be matched to that generated by a point of the object, as discussed hereinabove, and thus to construct a hologram on the photosensitive holographic detector 59 which brightly reconstructs an image of that object vibrating point. A reference wavefront 76 in FIG. 6 is a single frequency coherent wavefront.

Figure 7:
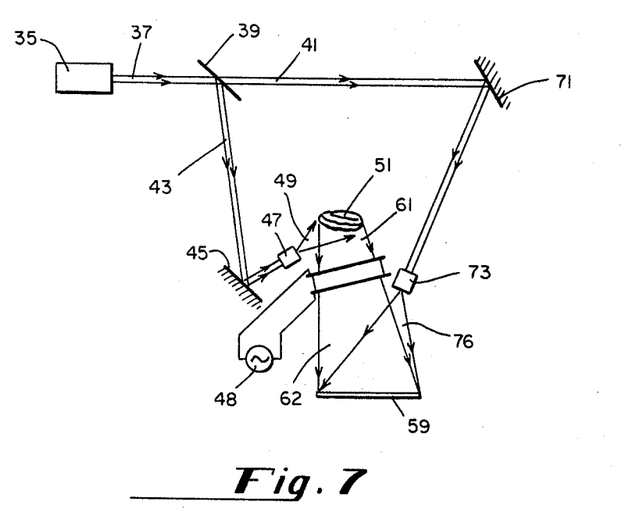
FIG. 7 shows still another specific embodiment of the present invention which utilizes an optical crystal for modulating the object modified beam.

A further variation of the modulating technique of FIG. 5 is illustrated with respect to FIG. 7 wherein the object modified radiation reflected from the vibrating object 51 is modulated. An appropriate large area modulator 77 is positioned in the path of the object modified beams 51 to generate a beam 62 that has been modulated both by the vibrating object 51 and by the modulator 77. The reference beam 76 contains a single frequency coherent light wavefront for interference at the holographic detector 59 with the double modulated beam 62.

Figure 6:
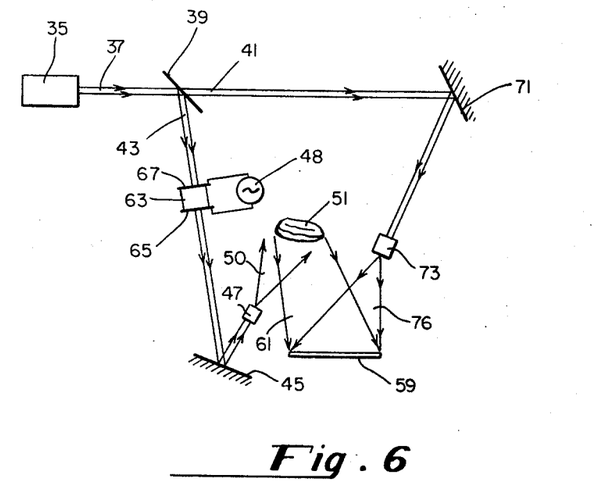
FIG. 6 shows yet another specific embodiment of the present invention which utilizes an optical crystal for modulating the object illuminating beam.

It will be recognized, of course, that modulation of the respective beams shown in FIGS. 6 and 7 may be accomplished with some means other than an electro-optical crystal, such as by the use of a vibrating mirror as discussed above with respect to reference beam modulation.

The invention has been described herein for determining amplitude of vibration once something is known of the character of object vibration. However, the techniques of this invention may also be applied to determine the character of the object vibration function. A hologram is preferably made of a vibrating object in real time so that the fringe patterns on a reconstructed image thereof may be observed for various modulations of the reference beam. Use of photochromic glass as the hologram detector allows such a real time examination of the vibrating object. The character of the reference beam modulation is then changed while the effect of such a change is observed on the fringe pattern of the holographically reconstructed image of the vibrating object.

It shall be understood the invention is not limited to the specific arrangements shown, and that changes and modifications may be made within the scope of the appended claims.

What is claimed is:

1. A method of constructing a hologram of an object which is vibrating with a fundamental frequency and with different amplitudes at various points thereof, comprising the steps of:
   illuminating said object with coherent radiation of a predetermined frequency, thereby generating object-modified radiation,
   placing a hologram detector in the path of said object modified radiation, and
   simultaneously directing onto said hologram detector a coherent reference radiation beam of only one predominate frequency which differs from the object illuminating radiation frequency by an integral multiple of at least two times the object vibrating fundamental frequency.

2. A method of determining the pattern of vibration of an object which is vibrating with a fundamental frequency and with different amplitudes at various points thereof, comprising the steps of,
   illuminating said object with coherent light radiation of a predetermined frequency, thereby generating object-modified radiation,
   placing a hologram detector in the path of said object modified radiation,
   simultaneously directing onto said hologram detector a coherent reference light radiation beam of only one predominate frequency which differs from the object illuminating radiation frequency by an integral multiple of the object vibrating fundamental frequency,
   illuminating said hologram detector with a reconstructing light beam in a manner to generate an image carrying diffracted beam of light, and
   positioning viewing optics in said image carrying diffracted beam and focusing said optics onto a reconstructed image of said object.

3. The method according to claim 2 wherein the step of directing onto a hologram detector a coherent reference radiation beam includes directing a radiation beam with said integral multiple being substantially equal to one.

4. A method of constructing a hologram of an object which is vibrating with a given motion function and with different amplitudes at various points thereof, comprising the steps of:

illuminating said vibrating object with coherent radiation of a predetermined frequency, thereby generating a frequency modulated object modified radiation beam, placing a radiation sensitive hologram detector in the path of said frequency modulated object modified radiation beam, simultaneously directing toward said hologram detector a beam of reference radiation that is mutually coherent with object illuminating radiation, and modulating said reference beam to provide a multiplicity of radiation wavelength components in the reference beam prior to its striking the detector, whereby said hologram detector is exposed to an interference pattern formed by the frequency modulated object modified and frequency modulated reference radiation beams.

5. A method of determining the pattern of vibration of an object which is vibrating with a fundamental frequency and with different amplitudes of various points thereof, comprising the steps of, illuminating said object with coherent radiation of a predetermined frequency, thereby generating object-modified radiation, placing a hologram detector in the path of said object modified radiation, simultaneously directing onto said hologram detector a coherent reference radiation beam of only one predominate frequency which differs from the object illuminating radiation frequency by an integral multiple of the object vibrating fundamental frequency, said integral multiple being equal to at least two, illuminating said hologram detector with a reconstructing light beam in a manner to generate an image carrying diffracted beam of light, and positioning viewing optics in said image carrying diffracted beam and focusing said optics onto a reconstructed image of said object.

6. A method of constructing a hologram of an object which is vibrating with a given motion function and with different amplitudes at various points thereof, comprising the steps of:

illuminating said object with coherent radiation of a predetermined frequency, thereby generating a frequency modulated object modified radiation beam, placing a hologram detector in the path of said object modified radiation beam, simultaneously directing toward said hologram detector a beam of reference radiation that is mutually coherent with said object illuminating radiation, and frequency modulating said reference beam prior to its striking the detector with a frequency and amplitude that are substantially equal to the frequency and amplitude of vibration of at least one object point, said frequency modulation occurring during exposure of said hologram detector, whereby a hologram is formed from which an image of the object may be reconstructed with a bright reconstruction of said at least one object point and with a fringe pattern superimposed over other points of the object to indicate portions of the object which are vibrating with either an amplitude or frequency that is different from that of said at least one object point.

7. A method of constructing a hologram of a vibrating object, comprising the steps of:

illuminating the vibrating object with coherent radiation of a single frequency, thereby forming a frequency modulated object modified radiation beam that includes a certain wavelength distribution of radiation from at least one vibrating object point, positioning a hologram detector in the path of said object modified radiation beam, and simultaneously directing onto said hologram detector a reference beam of radiation substantially consisting of said certain wavelength distribution, whereby interference of the object modified and reference beams forms a hologram from which an image of the object may be reconstructed with a bright reconstruction of said at least one object point and with a fringe pattern superimposed over other points of the object which indicates object portions that are vibrating with either a different amplitude or frequency from that of said at least one object point.

8. A method of determining a pattern of vibration of an object which is vibrating with a fundamental frequency and with different amplitudes at various points thereof, comprising the steps of:

illuminating said vibrating object with coherent radiation of a predetermined frequency, thereby generating a frequency modulated object-modified radiation beam, placing a hologram detector in the path of said object-modified radiation beam, simultaneously directing toward said hologram detector a beam of reference radiation that is mutually coherent with said object illuminating radiation, frequency modulating said reference radiation beam prior to its striking the detector, whereby the hologram detector is exposed to an interference of the object-modified and reference beams to form a hologram, illuminating said hologram with a reconstructing light beam in a manner to generate an image carrying diffracted beam of light, and positioning viewing optics in said image carrying diffracted beam and focusing said optics onto a reconstructed image of said object.

9. The method according to claim 8 wherein the step of frequency modulating said reference beam includes modulating said beam with a frequency and amplitude that are substantially equal to the frequency and amplitude of vibration of at least one object point, whereby a hologram is formed from which an image of the object may be reconstructed with a bright reconstruction of said at least one object point and with a fringe pattern superimposed over other points of the object to indicate portions of the object that are vibrating with either an amplitude or frequency that is different from that of said at least one object point.

10. A method of constructing a hologram of an object that is vibrating as the result of excitation by a non-sinusoidal mechanical function, said object vibration having a fundamental frequency and having different vibratory amplitudes at various points thereof, comprising the steps of:

illuminating said non-sinusoidally vibrating object with coherent radiation of a predetermined frequency, thereby generating object-modified radiation, placing a hologram detector in the path of said object-modified radiation, and simultaneously directing onto said hologram detector a coherent reference radiation beam of only one predominate frequency which differs from the object illuminating radiation frequency by an integral multiple of the object vibrating fundamental frequency.

11. The method according to claim 10 wherein the step of directing onto a hologram detector a coherent reference radiation beam includes directing a radiation beam with said integral multiple being substantially equal to one.

12. A method of constructing a hologram of a portion of an object that is vibrating with a fundamental frequency and with different amplitudes at various points thereof, said object characterized by a non-planar surface when at rest, comprising the steps of:

illuminating said non-planar object surface with coherent radiation of a predetermined frequency, thereby generating object-modified radiation, placing a hologram detector in the path of said object-modified radiation, and simultaneously directing onto said hologram detector a coherent reference radiation beam of only one predominate frequency which differs from the object illuminating radiation frequency by an integral multiple of the object vibrating fundamental frequency.

13. The method according to claim 12 wherein the step of directing onto a hologram detector a coherent reference radiation beam includes directing a radiation beam with said integral multiple being substantially equal to one.

14. A method of constructing a hologram of an object that is vibrating with a given motion function and with different amplitudes at various points thereof, comprising the steps of:

directing a coherent radiation beam of a predetermined frequency toward said vibrating object, thereby generating a frequency modulated object-modified radiation beam, positioning a radiation sensitive hologram detector in the path of said frequency modulated object-modified radiation beam, simultaneously directing toward said hologram detector a beam of reference radiation that is mutually coherent with said object illuminating beam, and modulating said object illuminating beam to cause the vibrating object to be illuminated with a multiplicity of radiation wavelength components, whereby said hologram detector is exposed to an interference pattern formed between a single frequency coherent reference beam and an object-modified beam that has been modulated both by the object vibration and modulation of the object illuminating beam.

15. A method of constructing a hologram of an object that is vibrating with a given motion function and with different amplitudes at various points thereof, comprising the steps of:

directing a coherent radiation beam of a predetermined frequency toward said vibrating object, thereby generating a frequency modulated object-modified radiation beam, positioning a radiation sensitive hologram detector in the path of said frequency modulated object-modified radiation beam, simultaneously directing toward said hologram detector a beam of reference radiation that is mutually coherent with said object illuminating beam, and modulating said object-modified beam to provide a multiplicity of radiation wavelength components therein in addition to those generated by the vibrating object.

16. A method of constructing a hologram of an object that is vibrating with a given motion function and with different amplitudes at various points thereof, comprising the steps of:

directing a first coherent light beam toward said vibrating object and thence as an object-modified beam to a photosensitive holographic detector, simultaneously directing a second coherent light beam toward said hologram detector to intersect the object-modified beam, said second beam being mutually coherent with said first beam prior to its striking the object, and modulating either of the first or second beams to provide a multiplicity of radiation wavelength components therein prior to striking the detector.

* * * * *

PO-1050
(5/69)

UNITED STATES PATENT OFFICE
CERTIFICATE OF CORRECTION

Patent No. 3,762,215          Dated October 2, 1973

Inventor(s) Carl C. Aleksoff

It is certified that error appears in the above-identified patent and that said Letters Patent are hereby corrected as shown below:

Column 4, line 65 the equation "$f_r \quad f_o$" should be written as follows: --$f_r \neq f_o$--

Signed and sealed this 19th day of February 1974.

(SEAL)
Attest:

EDWARD M. FLETCHER, JR.
Attesting Officer

C. MARSHALL DANN
Commissioner of Patents